United States Patent [19]

Crawford et al.

[11] 4,118,109

[45] Oct. 3, 1978

[54] OPTICAL APPARATUS FOR CONTROLLING THE DIRECTION OF A BEAM OF OPTICAL RADIATION

[75] Inventors: Ian Drummond Crawford, Edinburgh; Henry Bruce Marshall, West Linton; Robert John Cormack, Edinburgh, all of Scotland

[73] Assignee: Ferranti Limited, Hollinwood, England

[21] Appl. No.: 762,928

[22] Filed: Jan. 26, 1977

[30] Foreign Application Priority Data

Jan. 31, 1976 [GB] United Kingdom ............... 03904/76

[51] Int. Cl.$^2$ ............................................. G02B 5/04
[52] U.S. Cl. ........................................ 350/285; 350/6.4
[58] Field of Search ............................ 350/6, 285, 6.4

[56] References Cited

U.S. PATENT DOCUMENTS

| 2,975,668 | 3/1961 | Eckel | 350/6 |
| 3,297,395 | 1/1967 | Dardarian | 350/285 |
| 3,378,687 | 4/1968 | Schepler | 350/6 |
| 3,736,848 | 6/1973 | Tsuneta et al. | 350/6 |
| 3,827,787 | 8/1974 | Ripart | 350/6 |

*Primary Examiner*—John K. Corbin
*Assistant Examiner*—R. A. Rosenberger
*Attorney, Agent, or Firm*—Cameron, Kerkam, Sutton, Stowell & Stowell

[57] ABSTRACT

Apparatus for controlling the direction of a beam of optical radiation from, say, a laser, includes two prisms of small apex angle independently rotatable about a common axis. A control circuit is responsive to the actual angular positions of the prisms and to inputs indicating the desired beam position to cause the prisms to be moved to the appropriate positions.

4 Claims, 4 Drawing Figures

OPTICAL APPARATUS FOR CONTROLLING THE DIRECTION OF A BEAM OF OPTICAL RADIATION

This invention relates to optical apparatus, and in particular to such apparatus for controlling the direction of a beam of optical radiation without the need to move the source itself.

It is frequently necessary to vary the direction of a beam of radiation. In its simplest form, achieving this involves moving the source itself, together with any associated optical elements such as lenses. In some instances it is not convenient to move the source, and arrangements of mirrors may be used to achieve the desired result. It is known to use a pair of mirrors rotatable about axes perpendicular to one another to direct a beam of radiation in a required direction.

Where the source of optical radiation is a laser, it is preferable to "steer" the output beam in some way, rather than move the laser assembly itself. This may be, for example, because space is not available to allow for the laser itself to be moved, and because it is desirable to avoid the complexity of controlling the movement of a relatively massive object of high inertia. The use of mirrors, referred to above, has several disadvantages. The main one is that movement of a mirror in any direction will result in deflection of the beam, and it may be difficult to prevent movements about axes other than the desired axis of rotation. In fact, angular movements about these other axes results in angular deflection of the beam of twice the magnitude of the angular movement.

It is an object of the invention to provide an optical apparatus for controlling the direction of a beam of optical radiation which does not suffer from these disadvantages.

According to the present invention there is provided optical apparatus for controlling the direction of a beam of optical radiation, which includes first and second prisms each of small apex angle and mounted for rotation about a common axis with the planes bisecting their apex angles substantially parallel to one another and normal to said common axis, drive means operable to rotate each prism independently about said common axis and to determine the angular position of each prism relative to a datum direction, and control means responsive to the angular position of each prism and to signals indicating the desired direction of an output beam to control the drive means accordingly.

The beam of radiation referred to in the preceding paragraph may be radiation transmitted through the optical apparatus from a source, or it may alternatively be a beam of radiation incident upon the apparatus which directs it to some form of detector.

An embodiment of the invention will now be described with reference to the accompanying drawings, in which.

Figure 1:
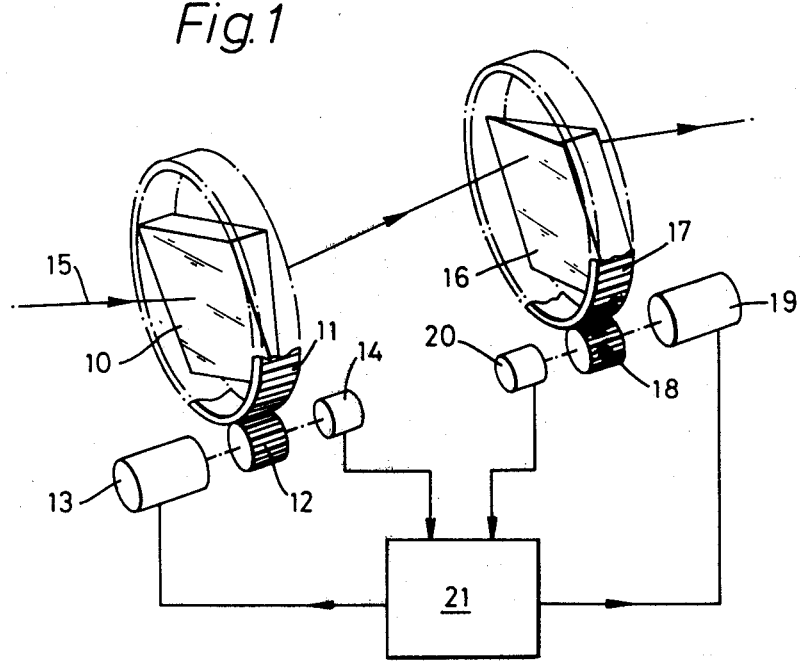
FIG. 1 is a schematic diagram illustrating part of the invention.

Referring now to FIG. 1, a first prism 10 of small apex angle is mounted in a carrier 11, part only of which is shown. The carrier is arranged to be rotatable about the optical axis 15 and is formed with a toothed gearing for cooperation with a pinion 12. The pinion is connected to a first motor 13 and a synchro resolver 14. A second prism 16, also of small apex angle is located adjacent to the first prism so that it intercepts the beam of radiation leaving the first prism. The planes bisecting the apex angles of prisms 10 and 16 are arranged to be approximately normal to the optical axis 15 about which the carriers rotate. The second prism is also mounted in a carrier 17 which is rotatable, and carries a toothed gear ring for engagement with a pinion 18 driven by a second motor 19. A second synchro resolver 20 is also connected to the second drive motor.

Rotation of the two prisms about the optical axis is possible quite independently of one another, whilst retaining the necessary relationship between the planes of the faces. The two resolvers 14 and 20 are arranged to give output signals which uniquely identify the angular position of the two prisms relative to a datum. The outputs of the two resolvers 14 and 20, and control inputs to the two drive motors 13 and 19 are connected to the control circuitry 21, which will be described in detail later.

If a conventional resolver is used it must be connected to the prism drive so that there is a 1:1 ratio between movement of the prism and movement of the resolver. However, other types of resolver may be used which require different gear ratios.

Unless a substantially monochromatic light source is used, the two prisms 10 and 16 should preferably be achromatic elements.

Figure 2:
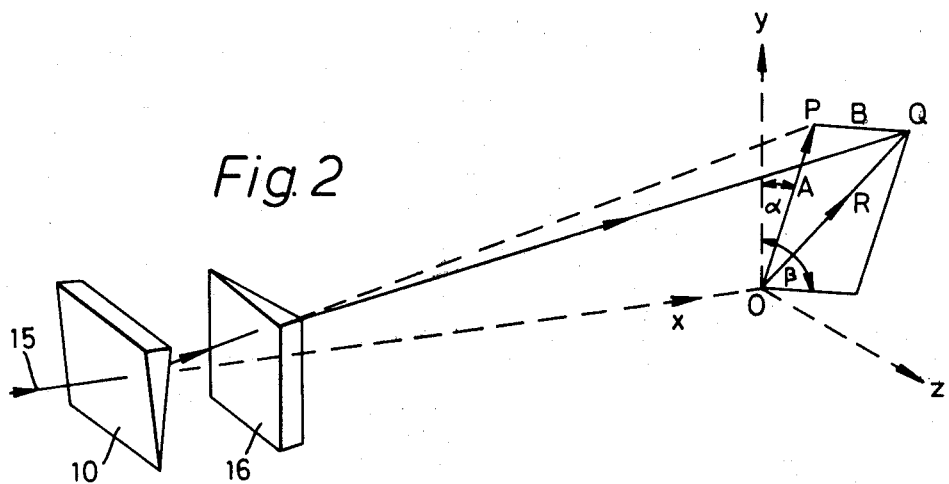
FIG. 2 is a schematic diagram illustrating the operation of the invention.

FIG. 2 illustrates the operation of the invention, and omits the constructional detail of FIG. 1. The two prisms 10 and 16 are shown, as is the incident beam of radiation 15. The optical axis of this beam is taken as the datum, or $x$ axis. The beam of radiation emerging from the first prism 10 is deviated through an angle dependent upon the apex angle of the prism and upon the refractive index of the prism material. Hence, by rotation of the prism 10 the emerging beam will follow the surface of a cone whole apex angle is twice the angle of deviation. The emerging beam from the first prism strikes the input surface of the second prism 16, and is again refracted. Although the angle of deviation of the second prism will not be constant, since the angle of incidence of the beam on the second prism will vary depending upon the relative positions of the two prisms, it may be assumed to be approximately constant since the prism 16 is arranged to operate under conditions of minimum deviation. By suitable angular positioning of the two prisms the beam emerging from the output surface of the second prism 16 can be made to occupy any position within the cone whose apex angle is approximately twice the sum of the angles of deviation of the two prisms. FIG. 2 shows how the deflection introduced by the first prism 10 may be represented by a vector A of length OP, at an angle $\alpha$ to the $y$ axis as shown. The additional deflection introduced by the second prism 16 is represented by a vector B of length PQ, at an angle $\beta$ to the same axis. Hence the resultant R represents the position actually occupied vy the beam. The direction of the beam may be moved from a path passing through point Q by suitable increments of the angle $\alpha$ and $\beta$, these increments being referred to as $d\alpha$ and $d\beta$. On the assumption that the vectors A and B are of equal magnitude representing the deviation $k$ for each prism, mathematical expressions may be derived relating these angle increments to the demanded elevation and azimuth inputs E' and A' as follows:

$$d\alpha = -\frac{(dE \cos \beta + dA \sin \beta)}{\sin (\alpha - \beta)} \quad :1$$

and $$d\beta = \frac{(dE \cos \alpha + dA \sin \alpha)}{\sin (\alpha - \beta)} \quad :2$$

where $dE = \frac{E'}{k} - (\cos \alpha + \cos \beta)$ and $dA = \frac{A'}{k} - (\sin \alpha + \sin \beta)$ Since $k (\cos \alpha + \cos \beta)$ represents the present angular deflection of the beam in elevation, and E' is the demand elevation, the term dE in the above expressions represents the elevation error of the output beam divided by the value $k$, which is to be regarded merely as a constant term. Similarly dA represents the azimuth error divided by $k$. The term "error" is used here in the sense of a servo error denoting the difference between the desired and actual values of the quantity.

Equations 1 and 2 relate these errors in elevation and azimuth deflections, themselves derivable from the known values of E', $k$, $\alpha$ and $\beta$, to the corresponding corrections $d\alpha$ and $d\beta$ which are to be applied to the angular positions from datum of the two prisms. A servo system may be set up to drive the prisms to reduce these errors to zero and so steer the beam in the required direction.

Figure 3:
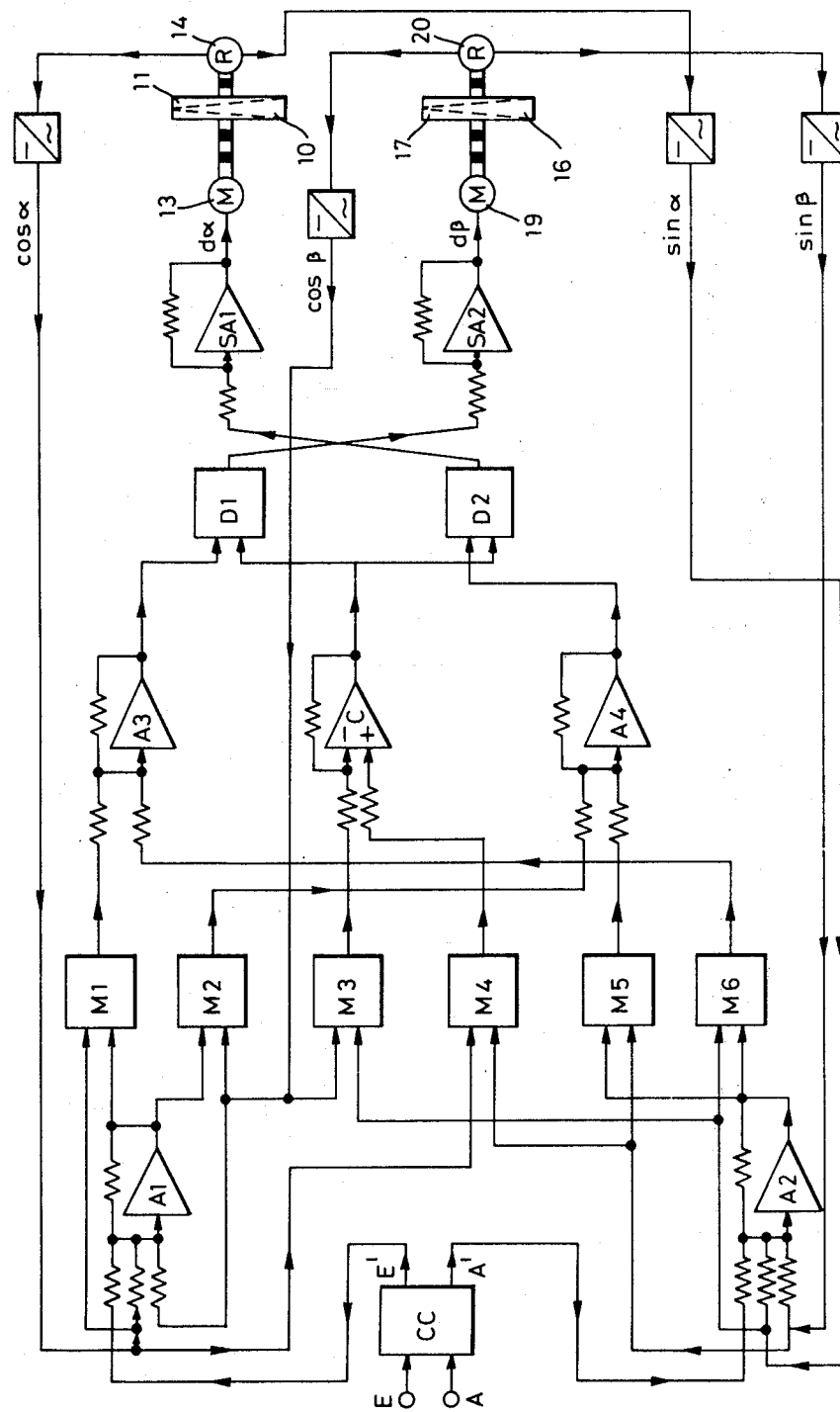
FIG. 3 is a block diagram of the control means of FIG. 1.

FIG. 3 shows a block diagram of the control means necessary to rotate the two prisms to positions indicated by the inputs E and A. The prisms and drive means are also shown.

The right-hand side of FIG. 3, shows, in schematic form, the first prism 10 in its carrier 11, together with its associated drive motor 13 and resolver 14. Similarly the second prism 16 is shown in its carrier 17, with drive motor 19 and resolver 20. Each resolver produces two output signals representing the sine and cosine of the angular position of the respective prism. These will be a.c. values, and are converted to d.c. quantities for use in the control circuit.

The demand input signals E and A are applied through a "centre circuit" unit CC the purpose of which will be described later. The elevation demand signal E' from the centre circuit is applied via a resistor network to a first summing amplifier A1, to which are also applied the cos $\alpha$ and cos $\beta$ signals. The values of the resistors are such that the output of the amplifier represents the expression $(E'/k) - (\cos \alpha + \cos \beta)$ which, as already stated, may for convenience be denoted by $dE$.

A multiplier circuit M1 has this dE signal from amplifier A1 as one of its inputs, the other being the cos $\alpha$ signal. The output from multiplier M1 thus represents the quantity dE cos $\alpha$. A second multiplier M2 has dE and cos $\beta$ as its two inputs, and therefore produces an output representing dE cos $\beta$. A third multiplier M3 has cos $\beta$ and sin $\alpha$ inputs, producing an output representing the product $\beta$, whilst a fourth multiplier M4 has cos $\alpha$ and sin $\beta$ inputs and produces an output representing cos $\alpha$. sin $\beta$.

The demand input signal A' from the "centre circuit" CC is applied via a second resistor network to a second summing amplifier A2, to which are also applied the sin $\alpha$ and sin $\beta$ signals. The values of the resistors are such that the output of the amplifier represents the expression $A'/k) - (\sin \alpha + \sin \beta)$ which, as already stated, may for convenience be denoted by $dA$.

A multiplier circuit M5 has this signal as one of its inputs, the other being the sin $\beta$ signal. The output from multiplier M5 thus represents the quantity dA sin $\beta$ Similarly a multiplier M6 has as its two inputs the dA and sin $\alpha$ signals, and therefore produces an output representing dA sin $\alpha$.

The outputs from multipliers M1 and M6 are combined in a summing amplifier A3 to give an output signal which represents the expression, $(dE \cos \alpha + dA \sin \beta)$ Similarly the outputs from multipliers M2 and M5 are combined in a summing amplifier A4 to give an output signal which represents the expression, $-(dE \cos \beta + dA \sin \beta)$ The remaining pair of multipliers M3 and M4 have their outputs connected to the two inputs of a comparator C which produces an output representing the difference between the two, namely $\sin \alpha \cos \beta - \cos \alpha \sin \beta$ or $\sin (\alpha - \beta)$ A dividing circuit D1 has the outputs of amplifier A3 and comparator C as its inputs, and its output thus represents the expression $$\frac{dE \cos \alpha + dA \sin \alpha}{\sin (\alpha - \beta)}$$

This is the required value $d\beta$, and is applied through servo amplifier SA2 to the motor 19 controlling prism 16.

A second dividing circuit D2 has the outputs of amplifier A4 and comparator C as its inputs, and its output thus represents the expression, $$-\frac{(dE \cos \beta + dA \sin \beta)}{\sin (\alpha - \beta)}$$

This is the required value $d\alpha$, and is applied through servo amplifier SA1 to the motor 13 controlling prism 10.

From the above expressions for $d\alpha$ and $d\beta$, it will be seen that a problem arises if $\sin(\alpha - \beta)$ is zero, since each expression, and hence the servo drive, is infinite. This would lead to serious instability. The situation arises only when the two prisms 10 and 16 are in positions where the difference between $\alpha$ and $\beta$ is either zero or 180°. This means that it is not possible to obtain either the maximum beam deflection equal to the sum of the deflections produced by each prism, or the minimum deflection equal to the difference of the deflections produced by each prism. The centre circuit CC is provided to ensure that these conditions cannot be achieved in practice. Alternative mechanical means may be used.

Figure 4:
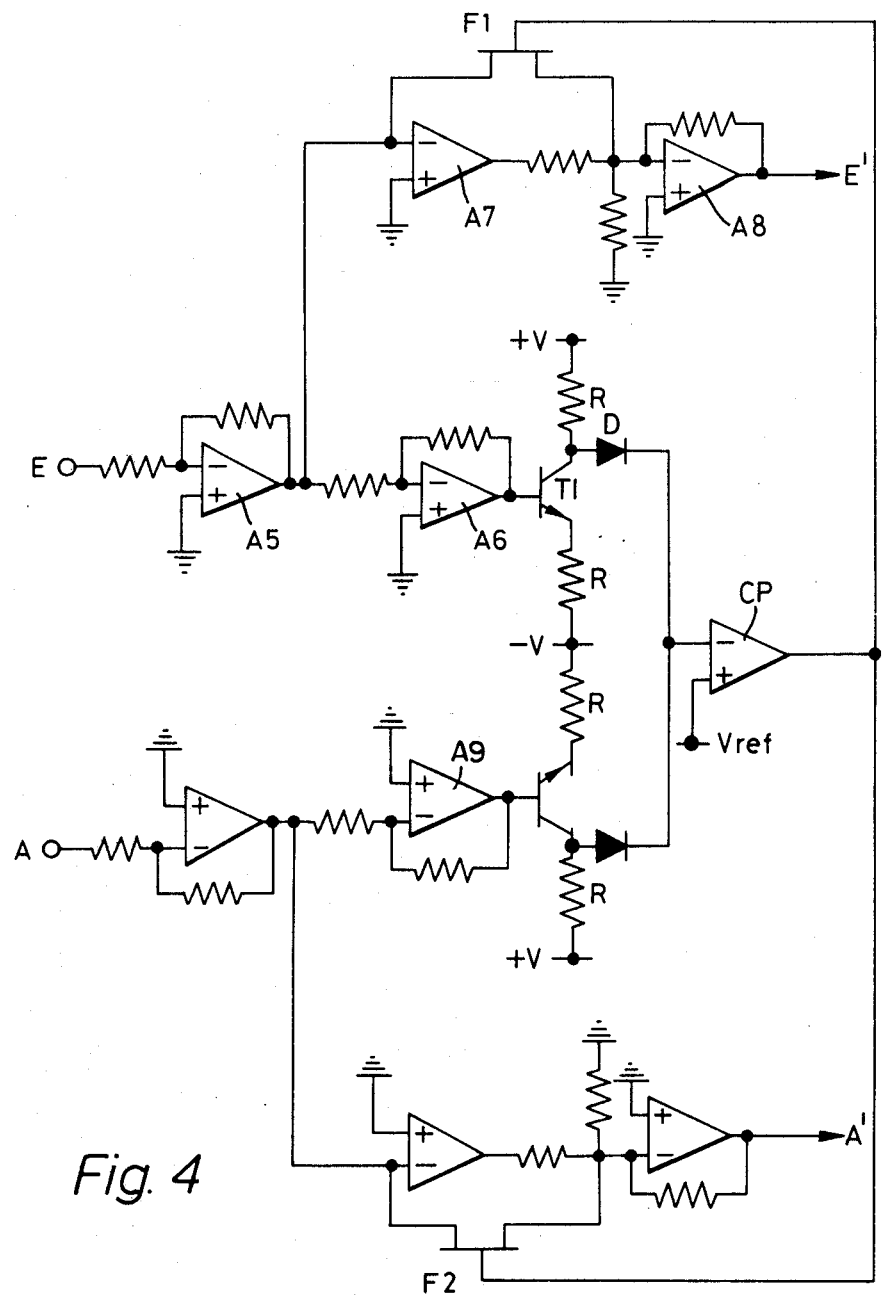
FIG. 4 is a diagram of part of the circuit of FIG. 3.

FIG. 4 illustrates one possible form of centre circuit. Referring to the drawings it will be seen that the azimuth and elevation channels are identical. Considering the elevation channel, the elevation demand input terminal E is connected to a unity gain buffer amplifier A5, the output of which forms the input of a second, low gain, amplifier A6. The output of amplifier A6 is connected to the base of an NPN transistor T1 connected by way of equal resistors R between supply rails +V and −V. The collector of the transistor is connected through a diode D, poled as shown, to the inverting input of a comparator CP.

The junction between amplifiers A5 and A6 is connected to a high-gain amplifier A7 and thence through a potential divider and an inverting buffer amplifier A8 to the elevation output E1 of the centre circuit. The input and output of the amplifier A7 are interconnected through an FET switch F1, the gate electrode of which is connected to the output of comparator CP.

The azimuth channel is connected in exactly the same way, having a high-gain amplifier A9 bypassed by an FET switch F2, also controlled by the comparator CP.

When the voltage on the base of transistor T1 is such as to cause the transistor to conduct, then the output voltage is substantially zero. On the other hand, when the transistor is cut-off, the voltage rises to +V. Hence the voltage applied to the input of the comparator is either 0 or +V.

The elevation and azimuth demand inputs E and A may be varied from a positive value through zero to a similar negative value, representing the range of variation of the deviation of a light beam passing through the prisms. For all values of E except values very close to zero, and representing very small values of deviation, the gain of amplifier A6 is such that its output voltage causes the comparator CP to hold the FET switch F1 closed. Amplifier A7 is thus bypassed, and the elevation demand signal applied to buffer A5 is the output of inverter A8. The same applies to the azimuth channel.

When the elevation demand input is small, the voltage appearing at the collector of transistor T1 falls below the reference voltage of the comparator CP. If the azimuth demand input is high, then this over-rides the elevation signal, and the FET switches stay closed. However, if both azimuth and elevation demand inputs are small, then the comparator output changes, and the two FET switches are opened.

The azimuth and elevation demand inputs are applied to the high gain amplifiers (A7 in the elevation channel). The gains of these amplifiers are such that even for very small or zero demand inputs the outputs of the amplifiers have a certain minimum value, thus preventing exact alignment of the two prisms controlled by the servo system.

By way of example only, the voltages +V and −V may be +10 volts and −10 volts, and the azimuth and elevation demand inputs may vary between +7 volts and −7 volts. The maximum values represent a total deviation of a beam entering the prisms of about 10° in any direction. The minimum deviation produced by the operation of the centre circuit described above is approximately $\frac{1}{2}$°.

If the dividers D1 and D2 (FIG. 3) are of a type which cannot divide by a negative denominator, then circuitry must be provided to invert the outputs of comparator C and of dividers D1 and D2 if the output of C should become negative.

It has been suggested above that each prism should have the same apex angle. This is not essential but does lead to simpler control circuitry. The apex angle itself depends upon the degree of control required to be exerted over the beam direction. An angle of deviation of 5° may be suitable, giving a maximum possible deflection of about 10°.

Other forms of analogue or digital computation and control may be used to solve the mathematical equations controlling wedge rotation. For example, values of sin α, cos α, sin β and cos β may be derived from the demanded elevation and azimuth inputs used to operate two servo resolvers controlling the angles α and β. Alternatively, a digital calculating circuit may be used to derive the angles α and β directly.

What we claim is:

1. Optical apparatus for controlling the direction of a beam of optical radiation, which includes first and second prisms, each of small apex angle and mounted for rotation on a common axis in the planes bisecting their apex angles substantially parallel to one another and normal to said common axis, drive means operable to rotate each prism independently about said common axis, pick-off means operable to determine the angular position of each prism relative to a datum direction and to deliver outputs representing the sine and cosine of the angles between the datum direction and the orientation of each prism, and control means responsive to said outputs to derive the changes in said angles necessary to move the output beam to a position determined by azimuth and elevation demand inputs, the changes being defined by the expressions $$d\alpha = \frac{-(dE \cos\beta + dA \sin\beta)}{\sin(\alpha - \beta)}$$

and $$d\beta = \frac{(dE \cos\alpha + dA \sin\alpha)}{\sin(\alpha - \beta)}$$

where

α is the angular displacement between the first prism and the datum,

β is the angular displacement between the second prism and the datum, dα and dβ are the respective changes in the angles α and β, $$dA = A'/k - (\sin \alpha + \sin \beta),$$

$$dE = E'/k - (\cos \alpha + \cos \beta),$$

A' is the azimuth demand input and E' is the elevation demand input, and k is the deviation produced by each prism.

2. Apparatus as claimed in claim 1 in which the pick-off means includes a synchro resolver.

3. Apparatus as claimed in claim 1 which includes a circuit operable to prevent sin (α − β) from attaining a zero value.

4. Apparatus as claimed in claim 3 in which the said circuit is operable when both the azimuth and elevation demand inputs fall below a predetermined value to apply values of A' and E' in excess of a minimum value to the control means.

* * * * *